(12) United States Patent
Nobu et al.

(10) Patent No.: US 6,374,973 B1
(45) Date of Patent: Apr. 23, 2002

(54) LOCK-UP CONTROL DEVICE FOR TORQUE CONVERTER

(75) Inventors: Hisao Nobu, Fujisawa; Tatsuo Wakahara, Kawasaki, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/688,212

(22) Filed: Oct. 16, 2000

(30) Foreign Application Priority Data

Oct. 18, 1999 (JP) ............................................ 11-295441
Oct. 18, 1999 (JP) ............................................ 11-295592

(51) Int. Cl.[7] .......................... F16H 61/14; F16H 45/02
(52) U.S. Cl. ..................................................... 192/3.3
(58) Field of Search ............................... 192/3.3, 3.58; 74/733.1

(56) References Cited

U.S. PATENT DOCUMENTS 3,693,478 A * 9/1972 Malloy ..................... 192/3.3 X
4,152,894 A * 5/1979 Rumyantsev et al. .... 192/3.3 X
4,880,090 A * 11/1989 Ando ......................... 192/3.3
4,880,091 A * 11/1989 Hasegawa et al. .......... 192/3.3
5,719,768 A * 2/1998 Tashiro et al. ........... 192/3.3 X

FOREIGN PATENT DOCUMENTS

JP          63-293359       * 11/1988
JP           5-079560          3/1993

* cited by examiner

*Primary Examiner*—Rodney H. Bonck
(74) *Attorney, Agent, or Firm*—Foley & Lardner

(57) ABSTRACT

A lock-up control device comprises an inlet circuit which supplies oil to a torque converter chamber, an outlet circuit which discharges oil from the torque converter chamber, a signal output circuit which outputs a signal pressure according to a required engaging capacity of a lock-up clutch, and a lock-up control valve which outputs a lock-up control pressure according to the signal pressure from the signal output device. A lock-up control pressure which is fed back is input to the lock-up control valve so as to decrease the lock-up control pressure, and the pressure of the inlet circuit and pressure of the outlet circuit are input to the lock-up control valve so as to increase the lock-up control pressure. In this way, the pressure in the converter chamber is accurately reflected, and the lock-up control pressure is controlled so that a pressure differential between the lock-up control pressure and the torque converter chamber is a desired value.

5 Claims, 1 Drawing Sheet

LOCK-UP CONTROL DEVICE FOR TORQUE CONVERTER

FIELD OF THE INVENTION

The present invention relates to a lock-up control device of a torque converter used for an automatic transmission.

BACKGROUND OF THE INVENTION

A torque converter drives a turbine by oil stirred by an impeller, and transmits power by hydraulic power transmission. Although the torque converter increases torque and absorbs torque fluctuations, slip occurs between the impeller and turbine, so efficiency of the transmission decreases.

In a lock-up torque converter, the slip can be eliminated and efficiency of the transmission can be increased by locking the impeller and turbine by engaging a lock-up clutch in a running region where torque increase and absorption of torque fluctuation is unnecessary.

The torque converter disclosed by JP-A-H5-79560 published by the Japanese Patent Office in 1993 discloses a torque converter comprising a lock-up control chamber partitioned by a lock-up clutch piston from a converter chamber. When a lock-up control pressure is supplied to this lock-up control chamber, the lock-up clutch piston displaces so that the lock-up clutch is engaged, and the impeller and turbine are locked. This torque converter is a three circuit lock-up torque converter comprising an inlet circuit which supplies oil to the torque-converter chamber, an outlet circuit which discharges oil from the torque-converter chamber, and a lock-up control circuit which supplies lock-up control pressure to the lock-up control chamber.

In the three circuit torque converter, when the lock-up clutch piston receives the lock-up control pressure in the lock-up control chamber and locks the impeller and turbine, the lock-up piston must be displaced against the converter pressure in the converter chamber. Therefore, if the lock-up control pressure is not a value obtained by adding a pressure corresponding to the resistance due to the converter pressure to the pressure corresponding to the required engaging capacity of the lock-up clutch, the required lock-up clutch engaging capacity will not be obtained.

SUMMARY OF THE INVENTION

Therefore, the lock-up control pressure must always be controlled according to the converter pressure, and this control must be performed precisely regardless of variation in the source pressure.

It is therefore an object of this invention to arrange that there is no insufficiency of engaging force of the lock-up clutch even if there is a pressure difference between the converter pressure and an inlet/outlet pressure of a converter.

In order to achieve above object, this invention provides a lock-up control device for controlling a lock-up clutch in a torque converter, the lock-up clutch being engaged by supplying a lock-up control pressure, and the torque converter transmitting torque via a fluid in a torque converter when the lock-up clutch is disengaged and transmitting torque directly when the lock-up clutch is engaged. The lock-up control device comprises an inlet circuit which supplies fluid to the torque converter chamber, an outlet circuit which discharges fluid from the torque converter chamber, a signal output device which outputs a signal pressure according to a required engaging capacity of the lock-up clutch, and a lock-up control valve which outputs a lock-up control pressure according to the signal pressure.

The lock-up control pressure which is fed back is input to the lock-up control valve to decrease the lock-up control pressure, and the pressures in the inlet circuit and outlet circuit are input to the lock-up control valve to increase the lock-up control pressure.

According to an aspect of the invention, this invention provides a lock-up control device for controlling a lock-up clutch in a torque converter, the lock-up clutch being engaged by supplying a lock-up control pressure, and the torque converter transmitting torque via a fluid in a torque converter when the lock-up clutch is disengaged and transmitting torque directly when the lock-up clutch is engaged. The lock-up control device comprises an inlet circuit which supplies fluid to the torque converter chamber, an outlet circuit which discharges fluid from the torque converter chamber, a signal output device which outputs a signal pressure according to a required engaging capacity of the lock-up clutch, and a lock-up control valve which outputs a lock-up control pressure according to the signal pressure. The pressure of the inlet circuit, the pressure of the outlet circuit and the lock-up control pressure which is fed back, are input to the lock-up control valve. The lock-up control valve increases the lock-up control pressure when the pressure of the inlet circuit and pressure of the outlet circuit increase, and decreases the lock-up control pressure when the lock-up control pressure which is fed back increases.

The details as well as other features and advantages of this invention are set forth in the remainder of the specification and are shown in the accompanying drawings.

DESCRIPTION OF THE PREFERRED EMBODIMENTS

Figure 1:
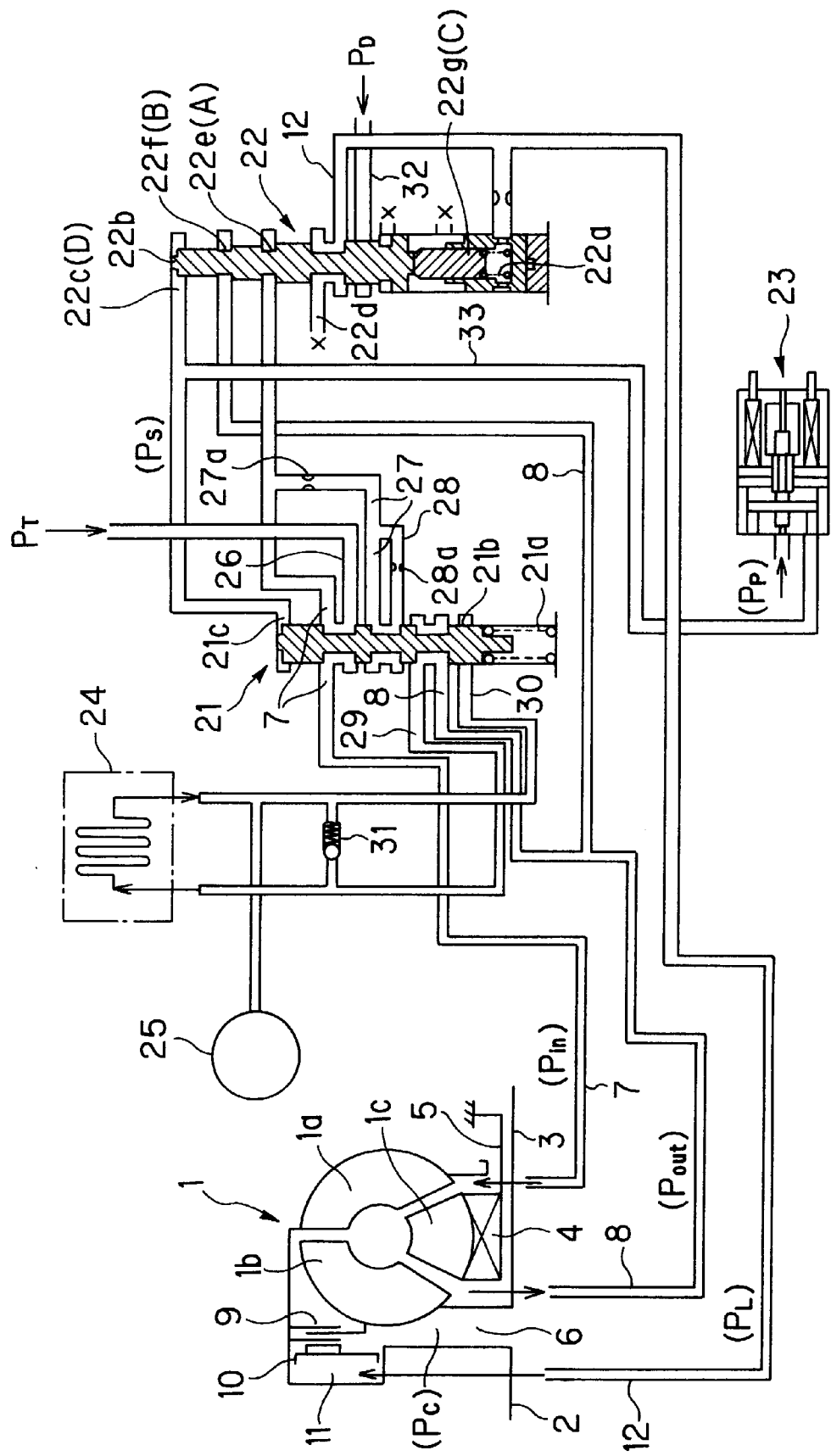
FIG. 1 shows an oil pressure circuit of a lock-up controller of a torque converter according to this invention.

Referring to FIG. 1 of the drawing, a three circuit lock-up torque converter 1 comprises an impeller 1a, a turbine 1b disposed facing the impeller 1a, and a stator 1c. The impeller 1a is joined to a crankshaft 2 of an engine, not shown, and the turbine 1b is joined to an input shaft 3 of the automatic transmission, not shown. The stator 1c is disposed on a fixed shaft 5 via a one-way clutch 4 so that it cannot rotate in the opposite direction to the rotation direction of the engine. The stator 1c functions as a reactor.

Oil is supplied from a torque converter inlet circuit 7 to a converter chamber 6 housing the impeller 1a, turbine 2b and stator 1c, and the supplied oil is discharged to a torque converter outlet circuit 8. The oil in the converter chamber 6 is stirred by the impeller 1a driven by the engine, and after it impacts the turbine 1b, it is guided by the stator 1c to be returned to the impeller 1a. In this way, the turbine 1b is rotated while increasing the torque.

The torque converter 1 is further provided with a lock-up clutch 9 to lock the impeller 1a and turbine 1b. When a lock-up clutch piston 10 displaces, the lock-up clutch 9 is engaged, and the impeller 1a and turbine 1b are locked.

The lock-up clutch piston 10 partitions a lock-up control chamber 11 which is partitioned from the converter chamber 6. The lock-up clutch piston 10 displaces due to a force in the right-hand direction of the figure according to a differential pressure between a lock-up control pressure $P_L$ supplied to the lock-up control chamber 11 from the lock-up control circuit 12, and a converter pressure $P_C$ inside the converter chamber 6, engages the lock-up clutch 9, and locks the impeller 1a and turbine 1b.

Next, the oil pressure circuit of the lock-up controller will be described.

The oil pressure circuit comprises a torque converter control valve 21, lock-up control valve 22, lock-up solenoid 23 and oil cooler 24. A lubricating part 25 is a lubricating part of the automatic transmission.

The torque converter control valve 21 supplies oil to the converter chamber 6 of the torque converter 1, and controls recirculation of oil to the oil cooler 24 and lubricating part 25. A spool 21b is maintained in the normal position shown in the figure by a spring 21a. When a signal pressure $P_S$ is supplied to the chamber 21c, the spool 21b is pushed down from the normal position to a working position against the spring 21a.

When the spool 21b is in the normal position, the torque converter control valve 21 causes an input circuit 26 to which a torque converter working pressure $P_T$ is supplied, to communicate with the torque converter inlet circuit 7, causes parallel circuits 27, 28 to communicate with each other, and causes the torque converter outlet circuit 8 to communicate with an oil cooler circuit 29 which connects to the inlet of the oil cooler 24. Orifices 27a, 28a are respectively interposed in parallel circuits 27a, 28a. The circuit 28 is connected to the circuit 27 at a position nearer the torque converter control valve 21 than the orifice 27a, and the circuit 27 is connected to the torque converter inlet circuit 7.

The spool 21b is pushed down from the position shown in the figure, and when it is in the working position, the torque converter control valve 21 causes the input circuit 26 to communicate with the circuit 27, causes the circuit 28 to communicate with the oil cooler circuit 29, and causes the torque converter outlet circuit 8 to communicate with a lubricating circuit 30 which connects to the lubricating part 25. An outlet of the oil cooler 24 is connected to the lubricating circuit 30, and oil which has flowed through the oil cooler 24 is supplied from the oil cooler circuit 29 to the lubricating part 25.

Here, a bypass valve 31 is provided between the oil cooler circuit 29 and lubricating circuit 30. The bypass valve 31 is a check valve which allows oil to flow from the circuit 29 to the circuit 30, but prevents flow in the reverse direction. The bypass valve 31 opens when the viscosity of the oil becomes high at low temperature, oil does not flow easily to the oil cooler 24, and the inlet pressure of the oil cooler 24 increases above a predetermined value. Oil which has been stopped by the oil cooler 24 then returns to an oil pan via the lubricating part 25. By providing the bypass valve 31, seizure of the automatic transmission due to decrease of oil flowing to the lubricating part 25 is prevented even when the viscosity of the oil becomes high at low temperature.

Here, the opening pressure of the bypass valve 31 is determined as follows.

The decrease of oil flow to the oil cooler 24 due to the high viscosity of the oil, and seizure of the automatic transmission, occur when the oil is at low temperature. Therefore, at the temperature after warm-up when this problem does not occur, the above effect is achieved even if the bypass valve 31 is permanently closed.

However, if it is made possible to open the bypass valve 31 even at the temperature after warm-up, the bypass valve 31 can be opened and closed during lock-up at the temperature after warm up. If the bypass valve 31 is opened and closed during lock-up, the converter pressure $P_C$ of the converter chamber 6 varies via the circuit 29, and the engaging force of the lock-up clutch 9 varies so that a shock occurs.

Therefore, the bypass valve 31 is arranged not to open at the temperature after warm-up (e.g., over 40° C.) when lock-up is performed. Specifically, the set load of an internal spring which determines the opening pressure of the bypass valve 31 is set to a value at which the bypass valve 31 does not open due to the pressure generated at the inlet of the oil cooler 24 at the temperature at which lock-up is performed.

The lock-up control valve 22 performs lock-up control as to whether or not to perform lock-up of the torque converter 1 by supplying the lock-up control pressure $P_L$ to the lock-up control chamber 11, and controls the lock-up control pressure $P_L$ during lock up control. The spool 22b is supported in the normal position shown in the figure by the spring 22a. When the signal pressure $P_S$ is supplied to the chamber 22c, the spool 22b is pushed down from the normal position against the spring 22a and displaces to a working position.

When the spool 22b is in the normal position, the lock-up control valve 22 causes the lock-up control circuit 12 to communicate with the drain port 22d, eliminate the lock-up control pressure $P_L$, disengage the lock-up clutch 9, and place the torque converter 1 in the non-lock-up state.

When the spool 22b is pushed down from the normal position to the working position, the lock-up control valve 22 causes the lock-up control circuit 12 to communicate with the D-range pressure circuit 32 to which a D-range pressure $P_D$ generated when the selector lever of the automatic transmission is in a forward running range (D-range) and the vehicle is moving forwards, is supplied. This D-range pressure $P_D$ is taken as a source pressure, the lock-up control pressure $P_L$ is output to the lock-up control circuit 12, and the torque converter 1 is placed in the lock-up state.

A step 22e having a pressure receiving surface area A and a step 22f having a pressure receiving surface area B are further provided on the spool 22b of the lock-up control valve 22. A torque converter inlet pressure Pin in the torque converter inlet circuit 7 acts on the step 22e in the downward direction of the figure, and the torque converter outlet pressure Pout in the torque converter outlet circuit 8 acts on the step 22f in the downward direction of the figure. The lock-up control pressure PL which is fed back acts in the upward direction of the figure on the plug 22g having a pressure receiving surface area C. Herein, the pressure receiving surface areas of the steps 22e, 22f on which the torque converter inlet pressure Pin and torque converter outlet pressure Pout act, are set so that the sum (A+B) of the pressure receiving surface areas is identical to the pressure receiving surface area C of the plug 22g on which the lock-up clutch control pressure $P_L$ acts.

The spool 22b does not displace against the spring 22a merely due to the torque converter inlet pressure Pin and torque converter outlet pressure Pout acting on the steps 22e, 22f, but due to these pressures Pin, Pout and the lock-up control pressure $P_L$ which is fed back, and due to the relation (A+B=C) between the pressure receiving surface areas, the lock-up control pressure $P_L$ is precisely controlled to a value according to the signal pressure $P_S$ to the chamber 22c so that the pressure differential between the lock-up control pressure $P_L$ and the converter pressure $P_C$, i.e., the engaging force of the lock-up clutch 9, is the required value without any excess or insufficiency even if the D-range pressure $P_D$ varies or if the torque converter inlet pressure Pin and torque converter outlet pressure Pout do not accurately reflect the converter pressure $P_C$.

The reason for this will now be described.

A force in the downward direction of the figure due to the signal pressure $P_S$ in the chamber 22c, a force Pin·A in the downward direction of the figure due to the torque converter inlet pressure Pin acting on the step 22*e*, a force Pout·B in the downward direction of the figure due to the torque converter outlet pressure Pout acting on the step 22*f*, a force $P_L \cdot C$ due to the lock-up control pressure $P_L$ in the upward direction of the figure via the plug 22*g*, and a spring force $F_S$ in the upper direction of the figure due to the spring 22*a*, act on the spool 22*b* of the lock-up control valve 22. The lock-up control valve 22 controls the lock-up control pressure $P_L$ so that these forces are balanced, i.e., so that the following equation is satisfied:

$$P_S \cdot D + Pin \cdot A + Pout \cdot B = P_L \cdot C + F_S \tag{1}$$

Here, the engaging force of the lock-up clutch 9 due to the lock-up clutch piston 10 is proportional to the differential pressure $\Delta P_L (=P_L - P_C)$ between the lock-up control pressure $P_L$ controlled by the lock-up control valve 22 and the converter pressure $P_C$ in the converter chamber 6 as described above, and is expressed as a function of the differential pressure $\Delta P_L$.

Here, if the torque converter inlet pressure Pin and torque converter outlet pressure Pout have differences $\Delta P_1$, $\Delta P_2$ from the converter pressure $P_C$, and $$Pin = P_C + \Delta P_1$$

$$Pout = P_C - \Delta P_2,$$

the above equation (1) is expressed as:

$$P_S \cdot D + (P_C + \Delta P_1) \cdot A + (P_C - \Delta P_2) \cdot B = P_L \cdot C + F_S \tag{2}$$

Rearranging the equation (2) by the converter pressure $P_C$, the following equation (3) is obtained:

$$P_S \cdot D + P_C \cdot (A+B) + (\Delta P_1 \cdot A - \Delta P_2 \cdot B) = P_L \cdot C + F_S \tag{3}$$

Here, if the pressure receiving surface area B is set such that it satisfies the equation:

$$B = A \cdot \Delta P_1 / \Delta P_2 \tag{4}$$

the above equation (3) becomes:

$$P_S \cdot D + P_C \cdot (A+B) = P_L \cdot C + F_S \tag{5}$$

and $\Delta P_1$, $\Delta P_2$ are eliminated. Herein, as A+B=C, the above equation (5) becomes:

$$P_S \cdot D = (P_L - P_C) \cdot C + F_S \tag{6}$$

so the signal pressure $P_S$ is determined by:

$$P_S = (\Delta P_L \cdot C + F_S) / D \tag{7}$$

In the above equation (4), the converter pressure $P_C$ is a pressure obtaining when oil pressure falls due to pressure loss as oil flows in the converter chamber 1, and can generally be considered as an average value of the torque converter inlet pressure Pin and outlet pressure Pout. Therefore, the pressure receiving surface area A and B can be set equal considering that $\Delta P_1$ and $\Delta P_2$ are equal. To further improve the control precision, $\Delta P_1$, $\Delta P_2$ may be calculated considering the distribution of pressure loss in the torque converter 1, and the pressure receiving surface areas A, B set based thereon.

The D-range pressure $P_D$, which is the source pressure of the lock-up control pressure $P_L$, does not initially exist in the equation (1).

Therefore, in this embodiment, the lock-up control pressure $P_L$ can be precisely controlled according to the signal pressure $P_S$ to the chamber 22*c* so that the pressure differential between the lock-up control pressure $P_L$ and the converter pressure $P_C$, i.e., the engaging force of the lock-up clutch 9, is the required value even if the D-range pressure $P_D$ varies or if the torque converter inlet pressure Pin and torque converter outlet pressure Pout do not accurately reflect the converter pressure $P_C$, and have the deviations $\Delta P_1$, $\Delta P_2$ with respect to the converter pressure $P_C$.

The signal pressure $P_S$ is controlled by the lock-up solenoid 23. The lock-up solenoid 23 is a linear solenoid, and outputs the signal pressure $P_S$ proportional to the supply current to the signal pressure circuit 33 with a constant pilot pressure $P_P$ as the source pressure. The signal pressure circuit 33 is connected to the chamber 21*c* of the torque converter control valve 21 and the chamber 22*c* of the lock-up clutch control valve 22. Here, the current supplied to the lock-up solenoid 23 is determined according to the signal pressure $P_S$ calculated by the above equation (7) from the required engaging capacity of the lock-up clutch 9.

Next, the action of this lock-up controller will be described.

When the torque converter 1 is not to be locked up, current is not supplied to the lock-up solenoid 23, and the signal pressure $P_S$ is not output to the circuit 33.

Therefore, the spool 21*b* of the torque converter control valve 21 is in the normal position shown in the figure, and the torque converter working pressure $P_T$ in the input circuit 26 is supplied to the converter chamber 6 of the torque converter 1 from the torque converter inlet circuit 7. The torque converter outlet circuit 8 is made to communicate with the oil cooler circuit 29, and after oil returning from the converter chamber 6 is cooled by the oil cooler 24, it is supplied for lubricating the lubricating part 25 and is drained to the oil pan.

When the signal pressure $P_S$ is not generated when lock-up should not be performed, the spool 22*b* of the lock-up control valve 22 is in the normal position shown in the figure, the lock-up control circuit 12 is made to communicate with the drain port 22*d*, and the lock-up control pressure $P_L$ is eliminated. Therefore, as the piston 10 does not engage the lock-up clutch 9, and the torque converter 1 performs power transmission in the non lock-up state.

When the torque converter 1 is to be engaged, current is supplied to the lock-up solenoid 23, and the signal pressure $P_S$ proportional to the current value is output to the circuit 33. The spool 21*b* of the torque control valve 21 is pushed down to the working position from the normal position, and the spool 22*b* of the lock-up control valve 22 is also pushed down to the working position from the normal position.

When the spool 21*b* of the torque converter control valve 21 displaces to the working position, the input circuit 26 is made to communicate with the circuit 27, the circuit 28 is made to communicate with the oil cooler circuit 29, and the torque converter output circuit 8 is made to communicate with the lubricating circuit 30.

As a result, the torque converter working pressure $P_T$ of the input circuit 26 is introduced to the circuit 27. On one hand, the torque converter working pressure $P_T$ to the circuit 27 is supplied to the converter chamber 6 of the torque converter 1 from the torque converter inlet circuit 7 via the orifice 27*a*. On the other hand, oil is supplied to the oil cooler 24 from the circuit 29 via the orifice 28*a*, and after cooling, it is supplied for lubrication of the lubricating part 25 and is drained off to the oil pan. Oil returning from the converter chamber 6 is supplied for lubrication of the lubricating part 25 via the lubricating circuit 30, and then flows down to the oil pan.

When the spool 22b displaces to the working position described above, the lock-up control valve 22 outputs the lock-up control pressure $P_L$ which is proportional to the signal pressure $P_S$, i.e., a current amount supplied to the lock-up solenoid 23, to the lock-up control circuit 12 taking the D-range pressure from the D-range pressure circuit 32 as a source pressure. Due to the lock-up control pressure $P_L$, the lock-up clutch piston 10 displaces, the lock-up clutch 9 is engaged by a force according to the lock-up control pressure $P_L$, and torque converter 1 enters the lock-up state.

The signal pressure $P_S$ during lock-up is determined by the pressure value required to push the lock-up clutch piston 10 against the lock-up clutch 9 in opposition to the converter pressure $P_C$ with a force by which the required engaging capacity of the lock-up clutch 9 is obtained. Hence, the supply current to the lock-up solenoid 23 is determined corresponding to this pressure value $P_S$.

In this embodiment, the converter chamber inlet pressure Pin and outlet pressure Pout are made to act as described above on the lock-up control valve 22 which generates the lock-up control pressure $P_L$, the lock-up control pressure $P_L$ which is fed back is made to act in the reverse direction, and the lock-up control pressure $P_L$ is controlled so that the forces due to these are balanced.

Further, the sum (A+B) of the pressure receiving surface areas on which the converter inlet pressure Pin and outlet pressure Pout act, is arranged to be identical to the pressure receiving surface area C of the lock-up control pressure $P_L$, so engaging shocks and slip of the lock-up clutch 9 are prevented without any excess or insufficiency of the requirement for engaging force of the lock-up clutch 9 as described above, even if the converter inlet pressure Pin and outlet pressure Pout do not accurately reflect the converter pressure $P_C$ in the converter chamber 6, there are pressure differences $\Delta P_1$, $\Delta P_2$ between them, or the D-range pressure $P_D$ which is the source pressure, varies.

In this embodiment, as described above, during lock-up, oil returning from the converter chamber 6 to the circuit 8 is discharged to the oil pan via the lubricating circuit 30 and lubricating part 25 without passing through the oil cooler 24 which has a large resistance. Therefore, the converter pressure $P_C$ in the converter chamber 6 can be decreased, and the required engaging capacity of the lock-up clutch 9 can be achieved even if the lock-up control pressure $P_L$ is determined low by a corresponding amount. As the lock-up control pressure $P_L$ can be reduced, the stiffness of the torque converter 1 which must be designed to withstand this pressure can be suppressed low, and the capacity of the oil pump which supplies the oil can also be reduced. This is advantageous from the viewpoint of cost, reduces the drive load of the oil pump, and is largely beneficial from the viewpoint of fuel economy.

Moreover, when oil returning from the converter chamber 6 to the circuit 8 is discharged to the oil pan for this purpose, the discharged oil is led to the lubricating part 25 via the lubricating circuit 30, and is discharged to the oil pan after making effective use of it for lubricating the lubricating part 25, and impairment of oil balance between the inflowing oil amount and outflowing oil amount is prevented.

The bypass valve 31 is interposed between the oil cooler circuit 29 and lubricating circuit 30 so as to permit oil flow from the circuit 29 to the circuit 30, and prevent oil flow in reverse direction. As a result, when the viscosity of the oil increases at low temperature so that it does not flow easily to the oil cooler 24, and the inlet pressure of the oil cooler 24 increases above the valve opening pressure, the bypass valve 31 opens, and after oil which is stopped by the oil cooler 24 is directed to the lubricating part 25, it is returned to the oil pan.

Therefore, even if oil does not flow easily to the oil cooler 24 at low temperature and the oil amount flowing into the lubricating 25 from the oil cooler 24 decreases, the required lubricating oil amount can be maintained by opening the bypass valve 31, and seizure of the automatic transmission due to poor lubrication can be prevented.

Further, the opening pressure of the bypass valve 31 is set so that the bypass valve 31 does not open at the oil cooler inlet pressure (pressure inside the oil cooler circuit 29) in the temperature at which lock-up is performed, so the bypass valve 31 can be maintained in the closed state during lock-up. Therefore, the pressure in the converter chamber 6 due to opening and closing of the bypass valve 31 does not vary during lock-up, the engaging force of the lock-up clutch 9 does not vary, and shocks due to the variation of the lock-up engaging force are prevented.

The temperature range at which the bypass valve 31 is maintained in the closed state is the temperature range at which lock-up is performed. In this temperature range, oil does not reach such a high viscosity that it does not pass through the oil cooler easily, so the aforesaid advantage due to provision of the bypass valve 31 is still obtained.

In the aforesaid example, the inlet pressure and outlet pressure of the converter chamber are made to act in the same direction as the signal pressure, but conversely, the lock-up control pressure can be fed back in the same direction as the signal pressure, and the inlet pressure and outlet pressure of the converter chamber may be made to act in the reverse direction to the signal pressure.

The entire contents of Japanese Patent Applications P11-295441 (filed Oct. 18, 1999) and P11-295592 (filed Oct. 18, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A lock-up control device for controlling a lock-up clutch in a torque converter, the lock-up clutch being engaged by supplying a lock-up control pressure, the torque converter transmitting torque via a fluid in a torque converter when the lock-up clutch is disengaged and transmitting torque directly when the lock-up clutch is engaged, and the lock-up control device comprising:

an inlet circuit which supplies fluid to the torque converter chamber, an outlet circuit which discharges fluid from the torque converter chamber, a signal output device which outputs a signal pressure according to a required engaging capacity of the lock-up clutch, and a lock-up control valve which outputs a lock-up control pressure according to the signal pressure, wherein
the lock-up control pressure which is fed back is input to the lock-up control valve to decrease the lock-up control pressure, and the pressures in the inlet circuit and outlet circuit are input to the lock-up control valve to increase the lock-up control pressure.

2. A lock-up control device as defined in claim 1, wherein the lock-up control valve comprises a spool which increases the lock-up control pressure when it moves in one direction, and decreases the lock-up control pressure when it moves in the other direction, the pressure from the signal pressure output device, the pressure of the inlet circuit and the pressure of the outlet circuit are applied to the spool in such a direction as to increase the lock-up control pressure, and the lock-up control pressure is applied to the spool in such a direction that the lock-up control pressure decreases.

3. A lock-up control device as defined in claim 1, wherein the signal pressure output device is a solenoid valve.

4. A lock-up control device as defined in claim 1, wherein the spool comprises a first pressure receiving surface to which the pressure of the inlet circuit is applied, a second pressure receiving surface to which the pressure of the outlet circuit is applied, and a feedback pressure receiving surface to which the lock-up control pressure is applied, and the sum of the surface area of the first pressure receiving surface and the surface area of the second pressure receiving surface is equal to the surface area of the feedback pressure receiving surface.

5. A lock-up control device for controlling a lock-up clutch in a torque converter, the lock-up clutch being engaged by supplying a lock-up control pressure, the torque converter transmitting torque via a fluid in a torque converter when the lock-up clutch is disengaged and transmitting torque directly when the lock-up clutch is engaged, and the lock-up control device comprising an inlet circuit which supplies fluid to the torque converter chamber, an outlet circuit which discharges fluid from the torque converter chamber, a signal output device which outputs a signal pressure according to a required engaging capacity of the lock-up clutch, and a lock-up control valve which outputs a lock-up control pressure according to the signal pressure, wherein the pressure of the inlet circuit, the pressure of the outlet circuit and the lock-up control pressure which is fed back, are input to the lock-up control valve, and the lock-up control valve increases the lock-up control pressure when the pressure of the inlet circuit and pressure of the outlet circuit increase, and decreases the lock-up control pressure when the lock-up control pressure which is fed back increases.

* * * * *